United States Patent
Gal

(10) Patent No.: US 11,978,183 B2
(45) Date of Patent: May 7, 2024

(54) IMAGE PROCESSING DEVICE AND IMAGE ENHANCING METHOD THEREOF

(71) Applicant: HANWHA TECHWIN CO., LTD., Seongnam-si (KR)

(72) Inventor: Jun Ho Gal, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 274 days.

(21) Appl. No.: 17/358,591

(22) Filed: Jun. 25, 2021

(65) Prior Publication Data

US 2022/0058781 A1    Feb. 24, 2022

(30) Foreign Application Priority Data

Aug. 24, 2020 (KR) .................. 10-2020-0106448

(51) Int. Cl.
G06K 9/00 (2022.01)
G06T 5/40 (2006.01)
G06T 5/50 (2006.01)
G06T 5/90 (2024.01)

(52) U.S. Cl.
CPC .............. *G06T 5/90* (2024.01); *G06T 5/40* (2013.01); *G06T 5/50* (2013.01); *G06T 2207/20021* (2013.01)

(58) Field of Classification Search
CPC .. G06T 5/40; G06T 5/20; G06T 5/009; G06T 5/007; G06T 5/00; G06T 5/001; G06T 5/50; G06T 2207/20021
See application file for complete search history.

(56) References Cited

U.S. PATENT DOCUMENTS

| | | | |
|---|---|---|---|
| 8,995,765 B2 * | 3/2015 | Kim | G06T 5/003 382/167 |
| 10,475,188 B2 | 11/2019 | Gal et al. | |
| 2011/0150356 A1 * | 6/2011 | Jo | G06T 5/002 382/269 |
| 2015/0201109 A1 * | 7/2015 | Li | H04N 1/4072 348/222.1 |
| 2016/0035069 A1 * | 2/2016 | Min | G06T 5/10 382/266 |

(Continued)

FOREIGN PATENT DOCUMENTS

| | | |
|---|---|---|
| KR | 10-0925794 B1 | 11/2009 |
| KR | 10-1389359 B1 | 4/2014 |
| KR | 10-1665132 B1 | 10/2015 |

OTHER PUBLICATIONS

Kim, J. H., Jang, W. D., Sim, J. Y., & Kim, C. S. (2013). Optimized contrast enhancement for real-time image and video dehazing. Journal of Visual Communication and Image Representation, 24(3), 410-425. (Year: 2013).*

*Primary Examiner* — Emily C Terrell
*Assistant Examiner* — Kevin M Coomber
(74) *Attorney, Agent, or Firm* — Sughrue Mion, PLLC

(57) ABSTRACT

An image processing device, including a first corrector configured to generate a first corrected image obtained by correcting a local intensity of an input image based on a complexity of an intensity distribution of the input image and an intensity value of an area around a pixel; and a second corrector configured to generate a second corrected image obtained by correcting a global intensity of the first corrected image based on a histogram of the input image.

12 Claims, 9 Drawing Sheets

(56) References Cited

U.S. PATENT DOCUMENTS

2018/0139363 A1\* 5/2018 Gal .................... H04N 1/58
2018/0374203 A1\* 12/2018 Xiao ................. G06T 5/007
2019/0180423 A1\* 6/2019 Lukac ................ G06T 5/20

\* cited by examiner

IMAGE PROCESSING DEVICE AND IMAGE ENHANCING METHOD THEREOF

CROSS-REFERENCE TO RELATED APPLICATION

This application is based on and claims priority under 35 U.S.C. § 119 to Korean Patent Application No. 10-2020-0106448, filed on Aug. 24, 2020, in the Korean Intellectual Property Office, the disclosure of which is incorporated by reference herein in its entirety.

BACKGROUND

1. Field

The disclosure relates to an image processing device and an image enhancing method thereof.

2. Description of Related Art

Closed circuit television (CCTV) systems are operated for extended periods of time, for example 24 hours per day, and thus, it is desirable for an image analysis system using a CCTV camera image to be designed to be robust against various environments. In order to establish an image analysis system that is robust against various environments it may be beneficial to provide a constant, high image quality of CCTV camera images.

SUMMARY

Provided are an image processing device for improving the visibility of an image and an image enhancing method thereof.

Additional aspects will be set forth in part in the description which follows and, in part, will be apparent from the description, or may be learned by practice of the presented embodiments of the disclosure.

In accordance with an aspect of the disclosure, an image processing device includes a first corrector configured to generate a first corrected image obtained by correcting a local intensity of an input image based on a complexity of an intensity distribution of the input image and an intensity value of an area around a pixel; and a second corrector configured to generate a second corrected image obtained by correcting a global intensity of the first corrected image based on a histogram of the input image.

The first corrector may further include a local intensity calculator configured to calculate a representative local intensity value of a current pixel by adjusting a size of a peripheral area of the current pixel, wherein the size determines the intensity value of the area around the pixel according to a complexity of the intensity distribution of the input image; a gamma calculator configured to calculate a local gamma value for correcting a pixel value of the current pixel by using the representative local intensity value of the current pixel; and a local intensity corrector configured to correct the pixel value of the current pixel by applying the local gamma value to the pixel value of the current pixel.

The local intensity calculator may further include a complexity calculator configured to calculate a complexity of a local intensity distribution of the current pixel based on an intensity distribution of the peripheral area of the current pixel; a first intensity calculator configured to calculate a first representative local intensity value corresponding to a local intensity distribution of a low complexity; a second intensity calculator configured to calculate a second representative local intensity value corresponding to a local intensity distribution of a high complexity; and a third intensity calculator configured to calculate the representative local intensity value of the current pixel based on the complexity of the local intensity distribution of the current pixel, the first representative local intensity value, and the second representative local intensity value.

The complexity calculator may be further configured to calculate the complexity of the local intensity distribution of the current pixel based on the intensity distribution of the peripheral area of the current pixel and a global intensity distribution of the input image.

The first intensity calculator may be further configured to set a first window having a first size with respect to the current pixel and calculate, as the first representative local intensity value, a first average value of a pixel value of the current pixel and pixel values of peripheral pixels in the first window, and the second intensity calculator may be further configured to move a second window having a second size that is smaller than the first size, in a plurality of directions with respect to the current pixel, and calculate, as the second representative local intensity value, a second average value of a pixel value of the current pixel and pixel values of peripheral pixels in the second window.

The second intensity calculator may be further configured to calculate, as the second representative local intensity value, a minimum average value calculated in a direction corresponding to a minimum value from among a plurality of absolute values of a plurality of differences between a plurality of average values calculated in the plurality of directions and the pixel value of the current pixel.

A position of the current pixel in the second window may be modified according to the plurality of directions.

The third intensity calculator may be further configured to calculate the representative local intensity value of the current pixel by using the complexity of the local intensity distribution of the current pixel as a weight value and calculating a weighted sum of the first representative local intensity value and the second representative local intensity value.

The gamma calculator may be further configured to calculate the local gamma value by using the representative local intensity value of the current pixel as a weight value and calculating a weighted sum of a first gamma value set to correct a first portion that is brighter than a reference intensity and a second gamma value set to correct a second portion that is darker than the reference intensity.

The second corrector may be further configured to correct a pixel value of a current pixel of the first corrected image based on a result of comparing the pixel value of the current pixel of the first corrected image with a plurality of average intensity values corresponding to a plurality of cumulative probabilities preset in the histogram.

In accordance with an aspect of the disclosure, an image enhancing method performed by an image processing device includes generating a first corrected image obtained by correcting a local intensity of an input image based on a complexity of an intensity distribution of the input image and an intensity value of an area around a pixel; and generating a second corrected image obtained by correcting a global intensity of the first corrected image based on a histogram of the input image.

The image enhancing method may further include calculating a representative local intensity value of a current pixel by adjusting a size of a peripheral area of the current pixel, wherein the size determines the intensity value of the area around the pixel according to a complexity of the intensity distribution; calculating a local gamma value for correcting a pixel value of the current pixel by using the representative local intensity value of the current pixel; and generating the first corrected image by correcting the pixel value of the current pixel by applying the local gamma value to the pixel value of the current pixel.

The image enhancing method may further include calculating a complexity of a local intensity distribution of the current pixel based on an intensity distribution of the peripheral area of the current pixel; calculating a first representative local intensity value corresponding to a local intensity distribution of a low complexity; calculating a second representative local intensity value corresponding to a local intensity distribution of a high complexity; and calculating the representative local intensity value of the current pixel based on the complexity of the local intensity distribution of the current pixel, the first representative local intensity value, and the second representative local intensity value.

The image enhancing method may further include calculating the complexity of the local intensity distribution of the current pixel based on the intensity distribution of the peripheral area of the current pixel and a global intensity distribution of the input image.

The image enhancing method may further include setting a first window having a first size with respect to the current pixel and calculating, as the first representative local intensity value, a first average value of a pixel value of the current pixel and pixel values of peripheral pixels in the first window; and moving a second window having a second size that is smaller than the first size, in a plurality of directions with respect to the current pixel, and calculating, as the second representative local intensity value, a second average value of a pixel value of the current pixel and pixel values of peripheral pixels in the second window.

The image enhancing method may further include calculating, as the second representative local intensity value, a minimum average value calculated in a direction corresponding to a minimum value from among a plurality of absolute values of a plurality of differences between a plurality of average values calculated in the plurality of directions and the pixel value of the current pixel.

A position of the current pixel in the second window may be modified according to the plurality of directions.

The image enhancing method may further include calculating the representative local intensity value of the current pixel by using the complexity of the local intensity distribution of the current pixel as a weight value and calculating a weighted sum of the first representative local intensity value and the second representative local intensity value.

The image enhancing method may further include calculating the local gamma value by using the representative local intensity value of the current pixel as a weight value and calculating a weighted sum of a first gamma value set to correct a first portion that is brighter than a reference intensity and a second gamma value set to correct a second portion that is darker than the reference intensity.

The image enhancing method may further include correcting a pixel value of a current pixel of the first corrected image based on a result of comparing the pixel value of the current pixel of the first corrected image with a plurality of average intensity values corresponding to a plurality of cumulative probabilities preset in the histogram, with the pixel value of the current pixel of the first corrected image.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
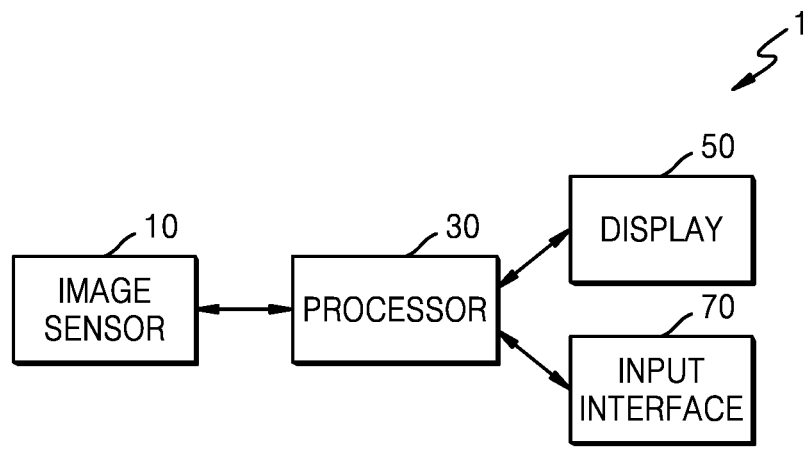
FIG. 1 is a schematic block diagram of an image processing device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following description exemplifies only the principles of the present disclosure. Even if they are not described or illustrated clearly in the present specification, those of ordinary skill in the art can embody the principles of the present disclosure and invent various apparatuses within the concept and scope of the present disclosure. The use of the conditional terms and embodiments presented in the present specification are intended only to make the concept of the present disclosure understood, and they are not limited to the embodiments and conditions mentioned in the specification. In addition, all the detailed description on the principles, viewpoints and embodiments and particular embodiments of the present disclosure should be understood to include structural and functional equivalents to them. The equivalents include not only currently known equivalents but also those to be developed in future, that is, all devices invented to perform the same function, regardless of their structures.

Therefore, functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared. The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

The foregoing objects, features, and advantages will be more apparent from the following detailed description made with reference to the accompanying drawings. In the description of the present disclosure, the detailed description of known techniques which might unnecessarily obscure the subject matter of the present disclosure will be omitted or made in brief.

When a part "includes" a component, it does not mean that the part does not include components other than the mentioned component but may include other components provided that there is no special indication to the contrary.

Hereinafter, embodiments of the present disclosure will be described in detail with reference to the accompanying drawings.

FIG. 1 is a schematic block diagram of an image processing device 1 according to an embodiment of the present disclosure.

Referring to FIG. 1, the image processing device 1 may include an image sensor 10, an image processor 30, a display 50, and an input interface 70.

The image processing device 1 may include various devices such as a surveillance camera including a visual camera, a thermal camera, and a special purpose camera, a wireless communication device, a personal digital assistant (PDA), a laptop computer, a desktop computer, a camcorder, a digital camera, a closed circuit television (CCTV), an action camera, a digital recording device, a network-enabled digital television, a mobile phone, a cellular phone, a satellite telephone, a camera phone, a two-way communication device, and the like. In embodiments, the image processing device 1 may be an image processing system in which at least one of the image sensor 10, the image processor 30, the display 50, and the input interface 70 is separately included and connected to the image processing device 1 in a wired or wireless manner to transmit or receive data.

The image sensor 10 may include a photoelectric conversion element such as a charge-coupled device (CCD) or a complementary metal oxide semiconductor (CMOS). The image sensor 10 may obtain image information by capturing an image of a scene in front thereof. A lens for receiving an optical signal may be included at a front end of the image sensor 10.

The image processor 30 may include, in various numbers, hardware or/and software components for executing certain functions. For example, the image processor 30 may refer to a data processing device embedded in a hardware component having a physically structured circuit to execute functions expressed in code or commands included in a program. Examples of the data processing device embedded in a hardware component as described above may include a microprocessor, a central processing unit (CPU), a processor core, a multiprocessor, and an application-specific integrated circuit (ASIC) circuit, a field programmable gate array (FPGA), and the like, but the scope of the present disclosure is not limited thereto.

The image processor 30 may perform signal processing for improvement of image quality, such as reducing noise of an image frame, gamma correction, color filter array interpolation, color matrix, color correction, color enhancement, or the like.

The image processor 30 may analyze an intensity, or for example a brightness, of an image input from the image sensor 10 to correct the image. The image processor 30 may increase the visibility of an image by correcting the image.

According to a human visual system (HVS) model, an image that a person observing a display such as a TV or a monitor visually senses as having good visibility has high global contrast of the entire image and high local sharpness in local areas. When an intensity distribution is close to a shape of a continuous uniform distribution on a histogram, the global contrast of the image is considered to be high. When an intensity distribution is similar to the continuous uniform distribution on the histogram, each of local areas or objects may be easily distinguished from others. In addition, local sharpness is considered to be high when dark or bright portions are easily distinguished from one another when observing a specific local area or an object of an image. Local sharpness may also be referred to as local contrast. In the entire image, when a local area is easily distinguished from another local area, or an object is easily distinguished from another object, then local areas or objects are considered to be clearly viewed.

According to an embodiment of the present disclosure, an image visibility level may be enhanced based on global visibility or global contrast and local visibility or local sharpness.

The image processor 30 may increase local visibility of an image by using gamma correction. The image processor 30 may calculate a representative local intensity value based on a complexity of an intensity distribution of an image and an intensity value of an area around a pixel, calculate a local gamma value based on the representative local intensity value, and correct the image by applying the local gamma value, thereby enhancing local visibility. The image processor 30 may enhance global visibility of an image by correcting an image in which the local visibility is enhanced, by analyzing a global histogram of the image. Detailed description of an example of this is provided below.

The display 50 may be connected to the image processor 30 in a wired or wireless manner and perform signal processing on an image output from the image processor 30 and provide the image to a user. The display 50 may include a liquid crystal display (LCD) panel, an organic light-emitting display (OLED) panel, an electrophoretic display panel (EPD), or the like. The display 50 is provided as a touchscreen to receive a user's touch input, and may operate as a user input interface.

The input interface 70 may be connected to the image processor 30 in a wired or wireless manner to generate input data for the control of the image processor 30. The input interface 70 may include a key pad, a dome switch, a touch pad, which may receive input through a contact-type capacitive method, a pressure-type resistive layer method, an infrared detection method, a surface ultrasonic conduction method, an integral tension measurement method, a piezoelectric effect method, etc., a mouse, a remote control, a jog wheel, a jog switch, or the like. The user may input parameters for image correction by using the input interface 70.

Figure 2:
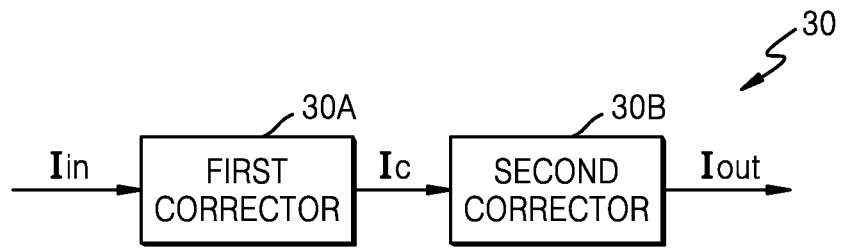
FIG. 2 is a schematic structural block diagram of an image processor according to an embodiment.
Figure 3:
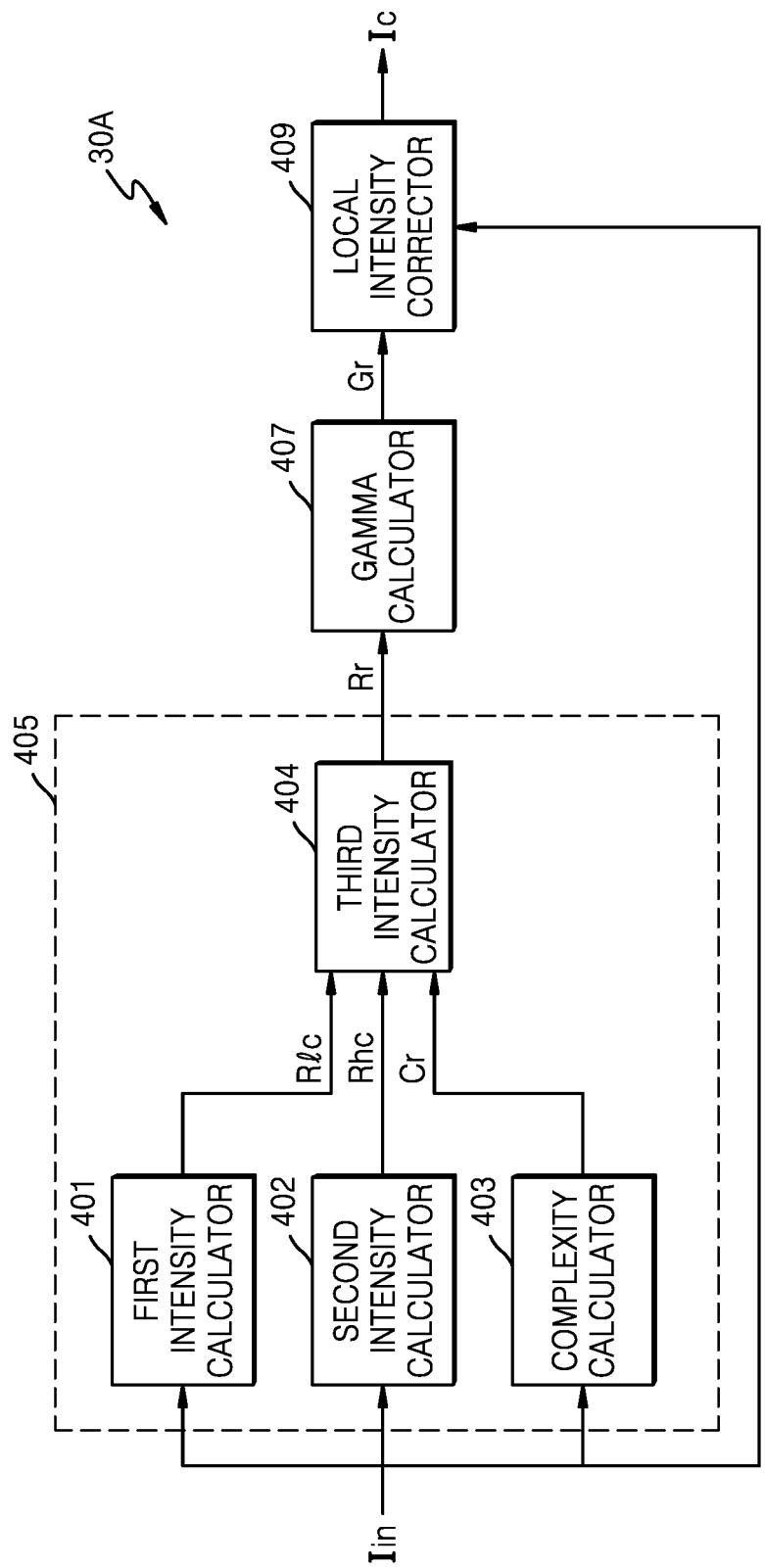
FIG. 3 is a schematic structural block diagram of a first corrector of the image processor illustrated in FIG. 2, according to an embodiment.
Figure 4:
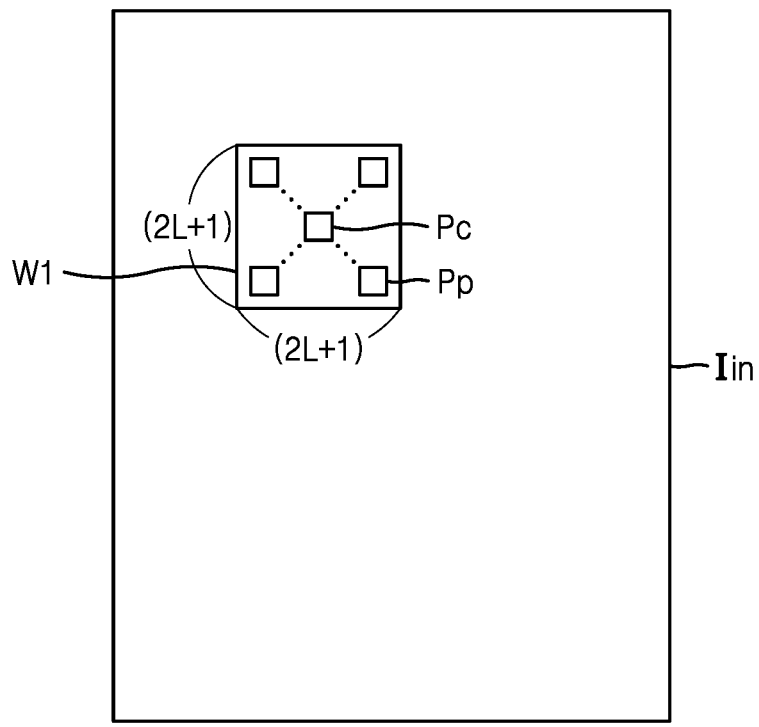
FIG. 4 is an example diagram for describing calculation of a first representative intensity value, according to an embodiment.
Figure 6:
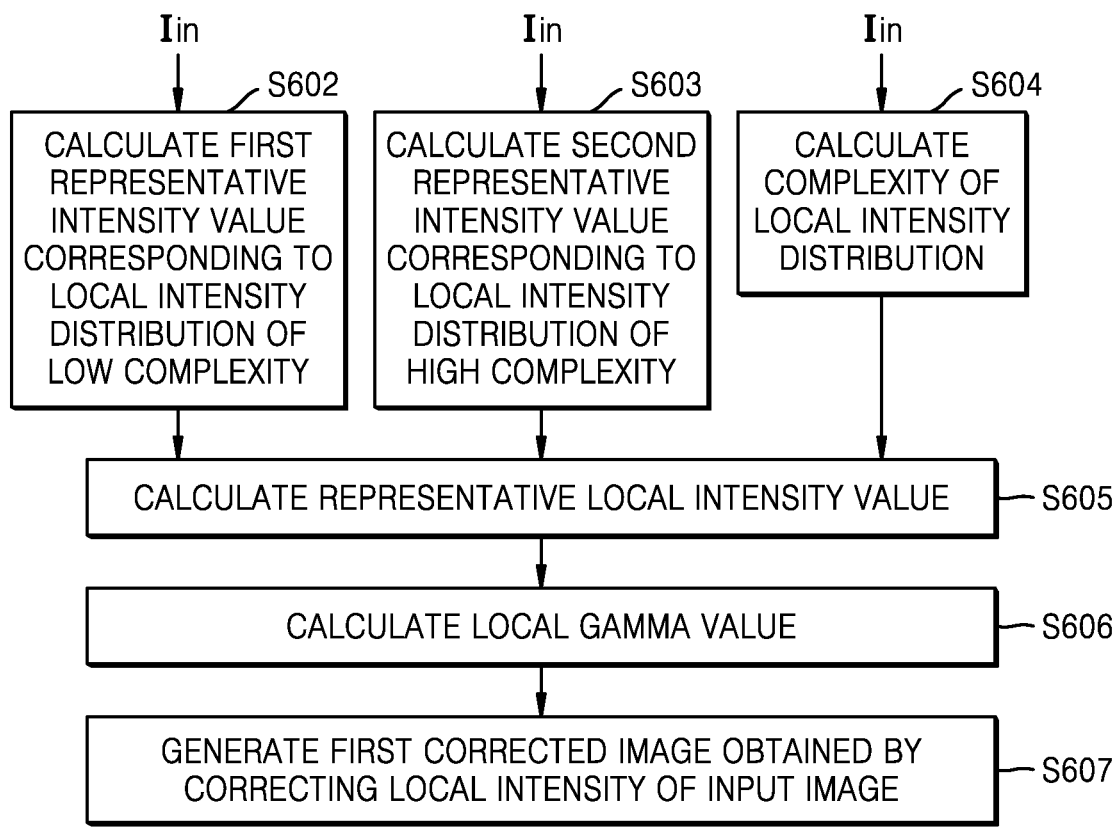
FIG. 6 is a schematic flowchart of image correction for increasing local visibility of the first corrector, according to an embodiment.
Figure 7:
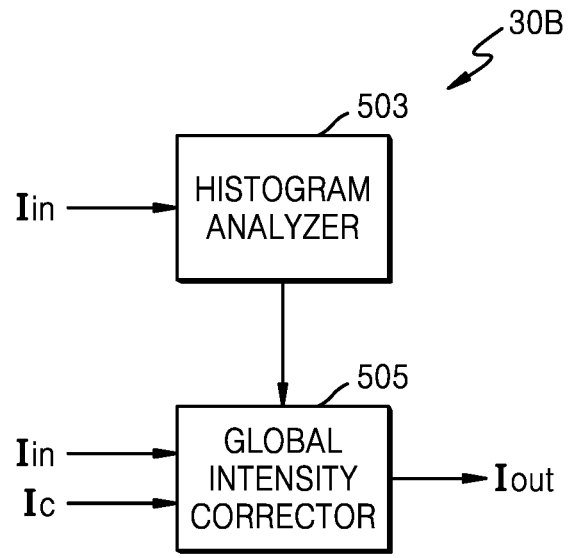
FIG. 7 is a schematic structural block diagram of a second corrector of the image processor illustrated in FIG. 2, according to an embodiment.
Figure 8:
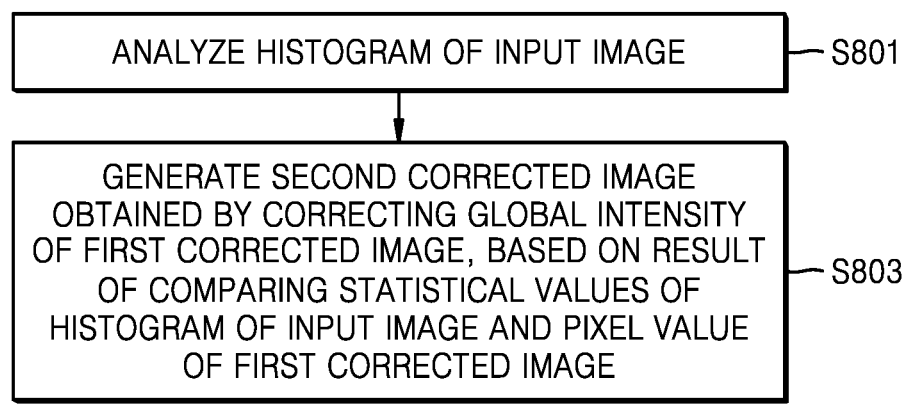
FIG. 8 is a schematic flowchart of image correction for increasing global visibility of the second corrector, according to an embodiment.

FIG. 2 is a schematic structural block diagram of an image processor according to an embodiment of the present disclosure. FIG. 3 is a schematic structural block diagram of a first corrector of the image processor illustrated in FIG. 2. FIG. 4 is an example diagram for describing calculation of a first representative intensity value, according to an embodiment. FIGS. 5A through 5I are example diagrams for describing calculation of a second representative intensity value, according to an embodiment. FIG. 6 is a schematic flowchart of image correction for increasing local visibility of the first corrector, according to an embodiment. FIG. 7 is a schematic structural block diagram of a second corrector of the image processor illustrated in FIG. 2. FIG. 8 is a schematic flowchart of image correction for increasing global visibility of the second corrector, according to an embodiment.

At least one of the first corrector and the second corrector represented by a block in FIG. 2 and at least one of their sub-components represented by a block in FIGS. 3 and 7 may be embodied as various numbers of hardware, software and/or firmware structures that execute respective functions described below, according to an embodiment. According to embodiments, at least one of these components and sub-components may use a direct circuit structure, such as a memory, a processor, a logic circuit, a look-up table, etc. that may execute the respective functions through controls of the image processor 30. Also, at least one of these components may be specifically embodied by a module, a program, or a part of code, which contains one or more executable instructions for performing specified logic functions, and executed by the image processor 30.

Referring to FIG. 2, the image processor 30 may include or implement a first corrector 30A and a second corrector 30B.

An input image Iin may include information on a plurality of pixels arranged in a plurality of rows and columns. A pixel may have a component defined in a color space. The color space may be an RGB color space, a YUV color space, a YCbCr color space, or the like, and the embodiment of the present disclosure is not limited to the color spaces described above, and may be applied to various color spaces. Hereinafter, a certain pixel, for example, a pixel having coordinates of (x, y) in an input image, which may be referred to as a 'current pixel', will be described as an example. A pixel value I(x, y) of the pixel is a value representing an intensity in a color space, and may have a value in a range of $0 \leq I(x, y) \leq 1$. For example, in an 8-bit image, a pixel value may be a value obtained by dividing one of 0 to 255 by 255, and in a 12-bit image, a pixel value may be a value obtained by dividing one of 0 to 4095 by 4095.

The first corrector 30A may generate a first corrected image obtained by correcting a local intensity of the input image based on a complexity of an intensity distribution of the input image and an intensity value of an area around the pixel. The first corrector 30A may generate a representative value of a local intensity in each pixel based on an average of pixel values of a current pixel Pc and peripheral pixels Pp in a surrounding area of the current pixel Pc. The first corrector 30A may generate a representative value of a local intensity of the input image Iin in each pixel while flexibly changing a range of pixels used in calculating a local intensity average according to a local intensity distribution. The first corrector 30A may generate a first corrected image Ic having an enhanced local visibility by performing a first correction on an intensity of the input image Iin based on the representative value of the local intensity of the input image Iin.

The second corrector 30B may generate a second corrected image Iout obtained by correcting a global intensity of the first corrected image Ic based on a histogram of the input image Iin. The second corrector 30B may generate the second corrected image Iout, a global visibility of which is enhanced, by performing a second correction on an intensity of the first corrected image Ic, the local visibility of which is enhanced by the first corrector 30A.

The first corrected image Ic having an enhanced local visibility may have a wide distribution of the local intensity, and thus, objects or areas may be overly saturated. In addition, a global contrast of an image may be reduced by an enhanced local visibility. This is because, in the case of local visibility enhancement or local sharpness enhancement, a relatively dark area may be brightened or a relatively bright area may be darkened throughout the entire image, and in the case of global contrast enhancement, a specific area of an image may be completely saturated. To compensate for this, the second corrector 30B may apply global linear stretching to the first corrected image Ic having a local sharpness enhanced by the enhanced local visibility, thereby reducing saturation and increasing global contrast.

Referring to FIG. 3, the first corrector 30A may include a local intensity calculator 405, a gamma calculator 407, and a local intensity corrector 409. An example of the first corrector 30A will be described below with reference to FIG. 6.

The local intensity calculator 405 may calculate a representative local intensity value of a current pixel by adjusting a size of a peripheral area of the current pixel, the size determining an intensity value of an area around the current pixel according to a complexity of an intensity distribution of the input image Iin. The local intensity calculator 405 may include a first intensity calculator 401, a second intensity calculator 402, a complexity calculator 403, and a third intensity calculator 404.

The first intensity calculator 401 may generate a first representative local intensity value $R_{lc}$ corresponding to an area with a low complexity of a local intensity distribution of the input image Iin in each pixel, which may be referred to as a 'low complexity area', at operation S602.

The first intensity calculator 401 may set a first window W1 of a certain size of $(2L+1) \times (2L+1)$ in the input image Iin, and calculate an average of pixel values I(x, y) of pixels included in the first window W1. As illustrated in FIG. 4, the current pixel Pc may be located at a center of the first window W1, and the first intensity calculator 401 may calculate an average value of pixel values of the current pixel Pc and the peripheral pixels Pp included in the first window W1. As shown in Equation (1) below, the first intensity calculator 401 may output an average value of the pixel values of the pixels in the first window W1 as a representative first local intensity value $R_{lc}(x, y)$. A value L determining the size of the first window W1 may be modified by definition by a user. For example, the first window W1 may be set to a size of 13×13, 21×21, or the like.

$$R_{lc}(x, y) = \sum_{n=-L}^{L} \sum_{m=-L}^{L} \frac{I(x+n, y+m)}{(2L+1) \times (2L+1)} \quad (1)$$

The second intensity calculator 402 may generate a second representative local intensity value $R_{hc}$ corresponding to an area with a high complexity of a local intensity distribution of the input image Iin in each, which may be referred to as a 'high complexity area', at operation S603.

The second intensity calculator 402 may set a second window W2 of a certain size of $(2M+1) \times (2M+1)$ in the input image Iin, and calculate an average of pixel values of pixels included in the second window W2. The second intensity calculator 402 may move the second window W2 in a plurality of directions with respect to the current pixel Pc, and generate a second representative local intensity value $R_{hc}$ based on an average value of the pixel values of the current pixel Pc and the peripheral pixels Pp included in the second window W2, wherein the average value is calculated from each direction. A position of the current pixel Pc in the second window W2 may be modified according to each of the plurality of directions. The second window W2 may have a smaller size than the first window W1. For example, the second window W2 may be set to 3×3, 5×5, or the like. Hereinafter, for convenience, the second window W2 having a size of 3×3 will be described as an example. When a complexity of a local intensity distribution is high, a result of using an average value of pixel values calculated using a window having a relatively small size which may allow only an intensity within an object including a current pixel to be considered, may ensure the proper representativeness of a local intensity. In addition, in an area of high complexity, the proper representativeness of a local intensity may be achieved when an average value of intensities is calculated according to a direction in which a current pixel is positioned within a window having a small size, by varying a direction of the window. As illustrated in FIGS. 5A through 5I, the second intensity calculator 402 may calculate an average value of pixel values of the current pixel Pc and the peripheral pixels Pp by moving the second window W2 such that a location of the current pixel Pc is varied within the second window W2, while the current pixel Pc is included in the second window W2. The second intensity calculator 402 may calculate an average value of pixel values of pixels in the second window W2 in each direction as shown in Equations (2) through (10) below.

$$R_{00}(x, y) = \sum_{n=-2}^{0} \sum_{m=-2}^{0} \frac{I(x+n, y+m)}{9}, \quad (2)$$

$$D_{00}(x, y) = \|I(x, y) - R_{00}(x, y)\|$$

$$R_{01}(x, y) = \sum_{n=-2}^{0} \sum_{m=-1}^{1} \frac{I(x+n, y+m)}{9}, \quad (3)$$

$$D_{01}(x, y) = \|I(x, y) - R_{01}(x, y)\|$$

$$R_{02}(x, y) = \sum_{n=-2}^{0} \sum_{m=0}^{2} \frac{I(x+n, y+m)}{9}, \quad (4)$$

$$D_{02}(x, y) = \|I(x, y) - R_{02}(x, y)\|$$

$$R_{10}(x, y) = \sum_{n=-1}^{1} \sum_{m=-2}^{0} \frac{I(x+n, y+m)}{9}, \quad (5)$$

$$D_{10}(x, y) = \|I(x, y) - R_{10}(x, y)\|$$

$$R_{11}(x, y) = \sum_{n=-1}^{1} \sum_{m=-1}^{1} \frac{I(x+n, y+m)}{9}, \quad (6)$$

$$D_{11}(x, y) = \|I(x, y) - R_{11}(x, y)\|$$

$$R_{12}(x, y) = \sum_{n=-1}^{1} \sum_{m=0}^{2} \frac{I(x+n, y+m)}{9}, \quad (7)$$

$$D_{12}(x, y) = \|I(x, y) - R_{12}(x, y)\|$$

$$R_{20}(x, y) = \sum_{n=0}^{2} \sum_{m=-2}^{0} \frac{I(x+n, y+m)}{9}, \quad (8)$$

$$D_{20}(x, y) = \|I(x, y) - R_{20}(x, y)\|$$

$$R_{21}(x, y) = \sum_{n=0}^{2} \sum_{m=-1}^{1} \frac{I(x+n, y+m)}{9}, \quad (9)$$

$$D_{21}(x, y) = \|I(x, y) - R_{21}(x, y)\|$$

$$R_{22}(x, y) = \sum_{n=0}^{2} \sum_{m=0}^{2} \frac{I(x+n, y+m)}{9}, \quad (10)$$

$$D_{22}(x, y) = \|I(x, y) - R_{22}(x, y)\|$$

Figure 5A:
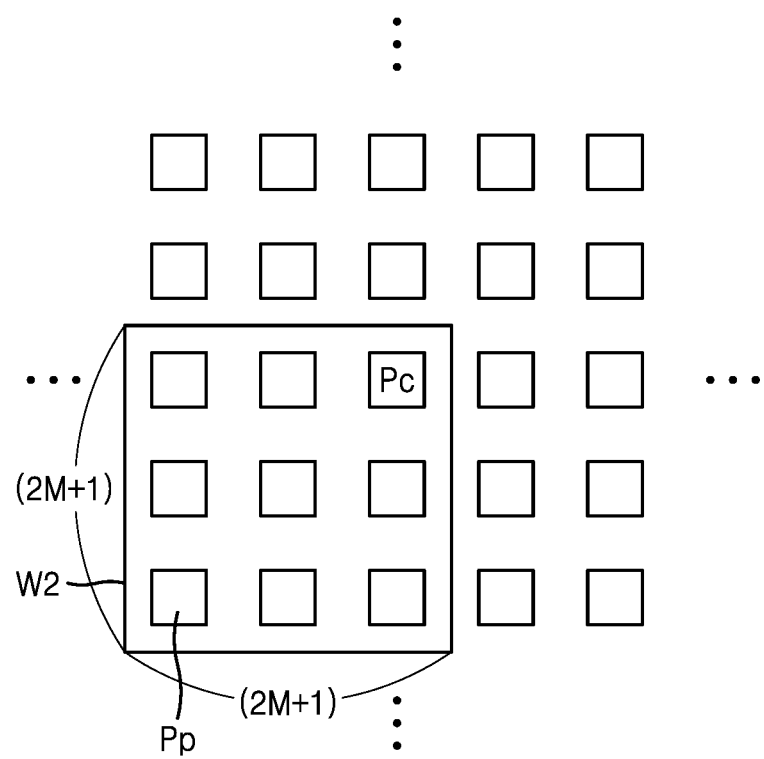
FIGS. 5A through 5I are example diagrams for describing calculation of a second representative intensity value, according to an embodiment.
Figure 5B:
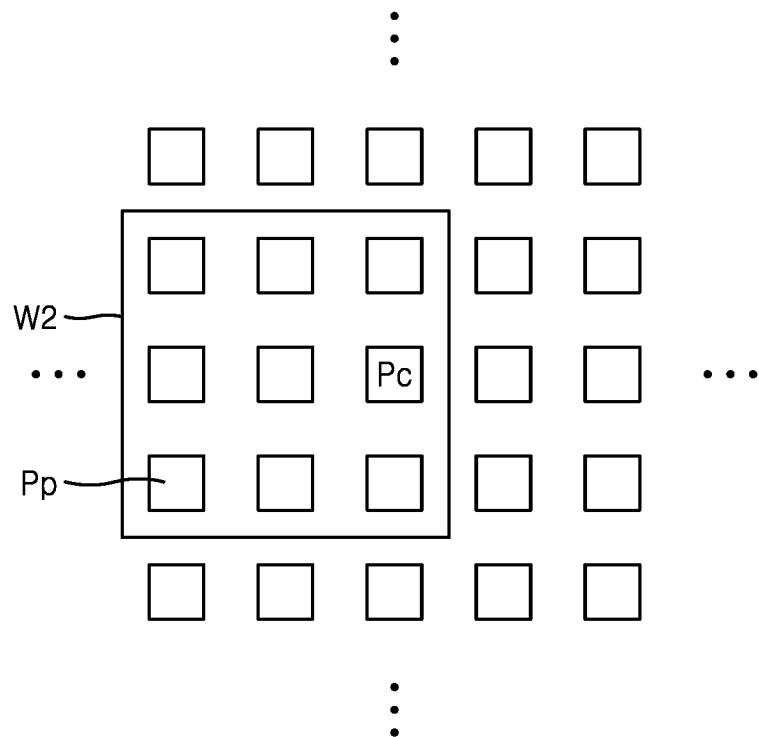
Figure 5C:
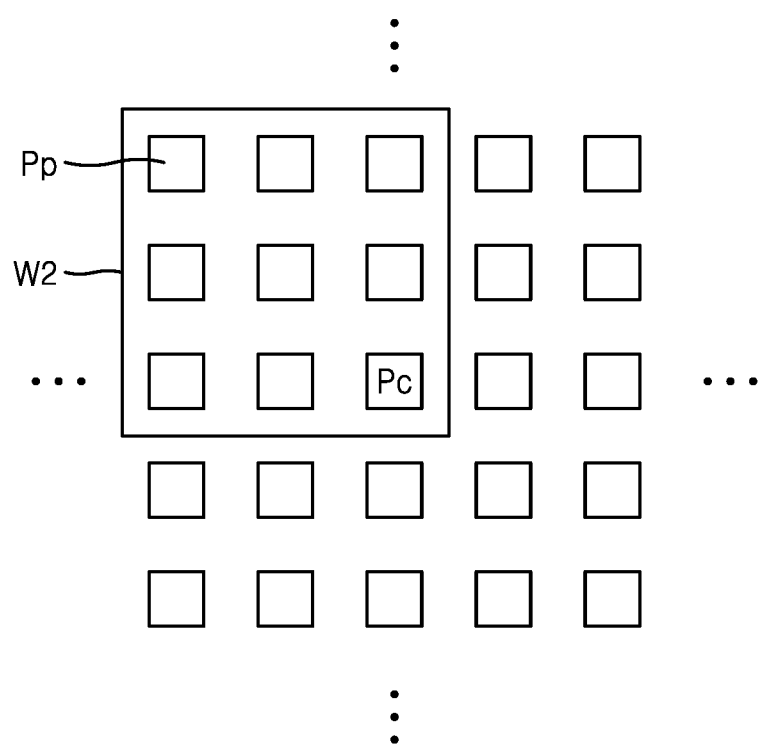
Figure 5D:
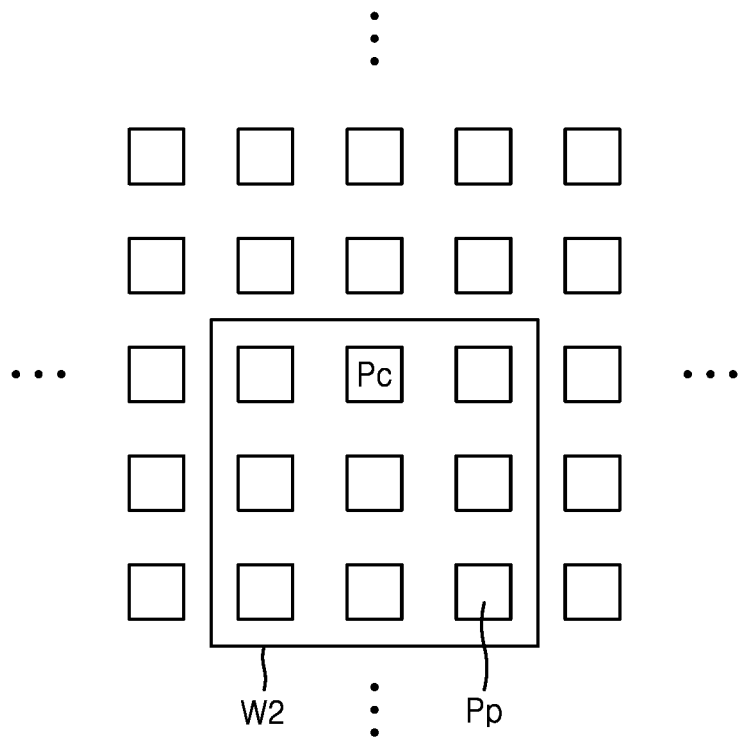
Figure 5E:
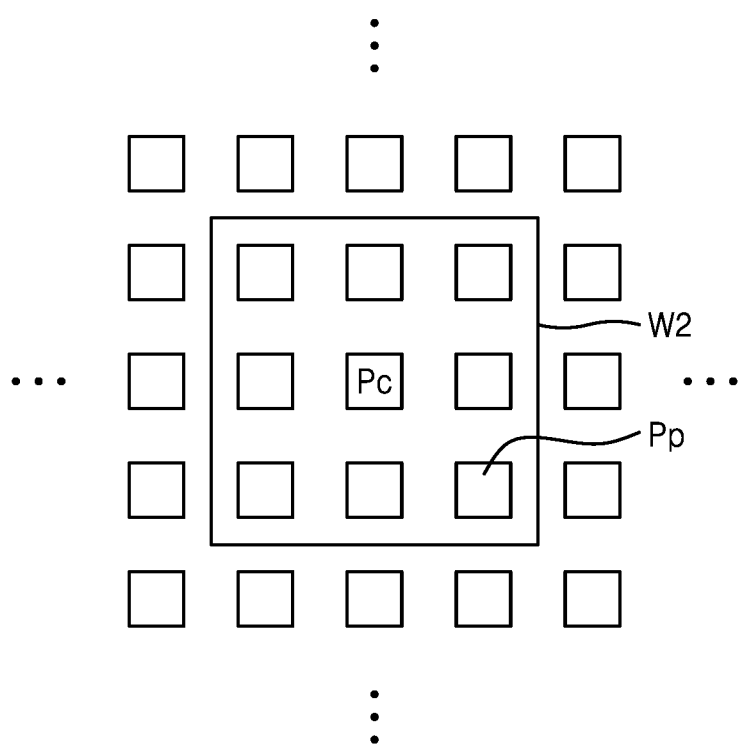
Figure 5F:
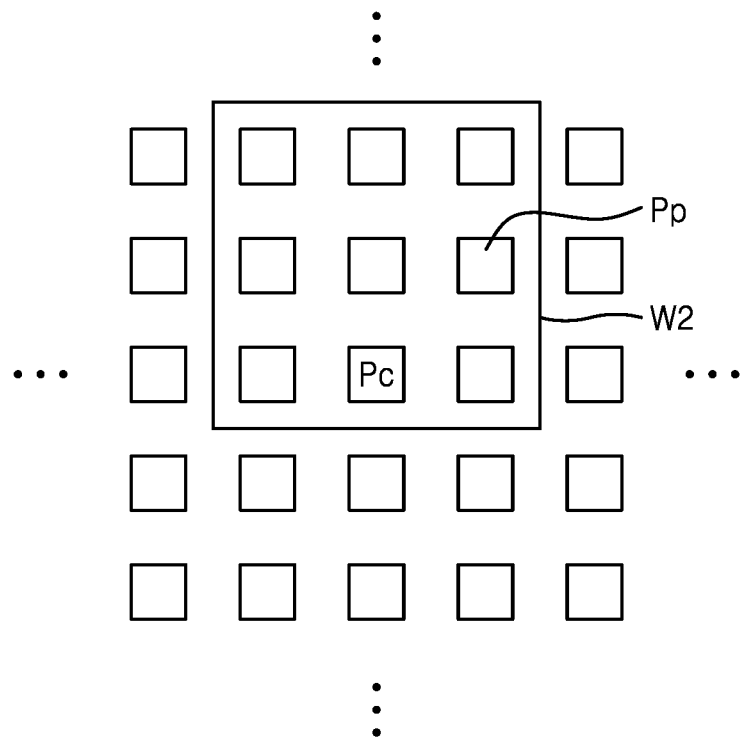
Figure 5G:
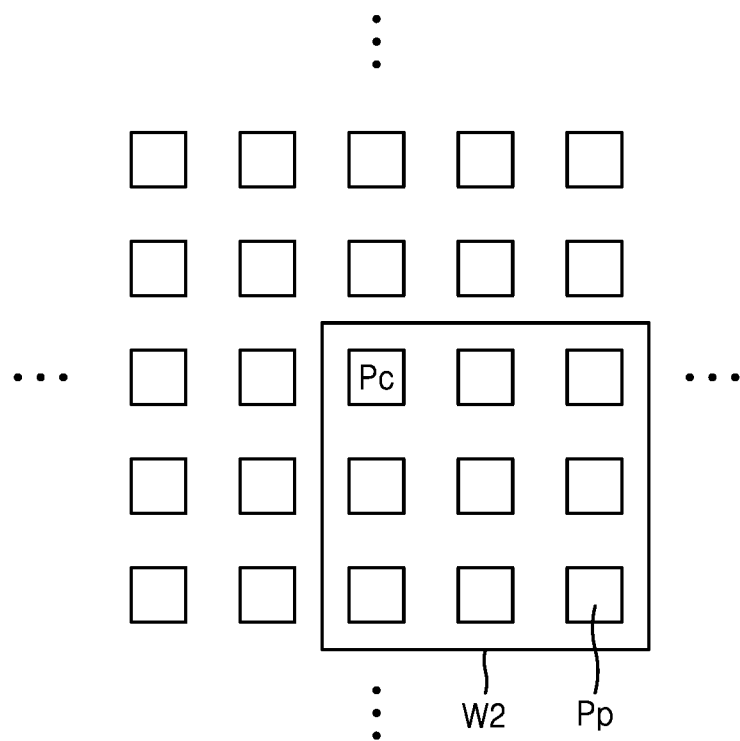
Figure 5H:
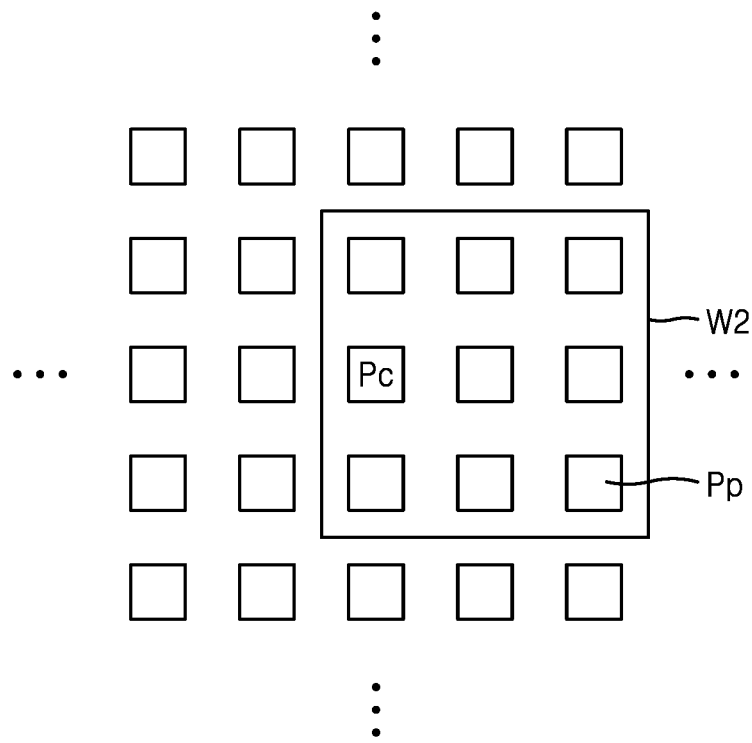
Figure 5I:
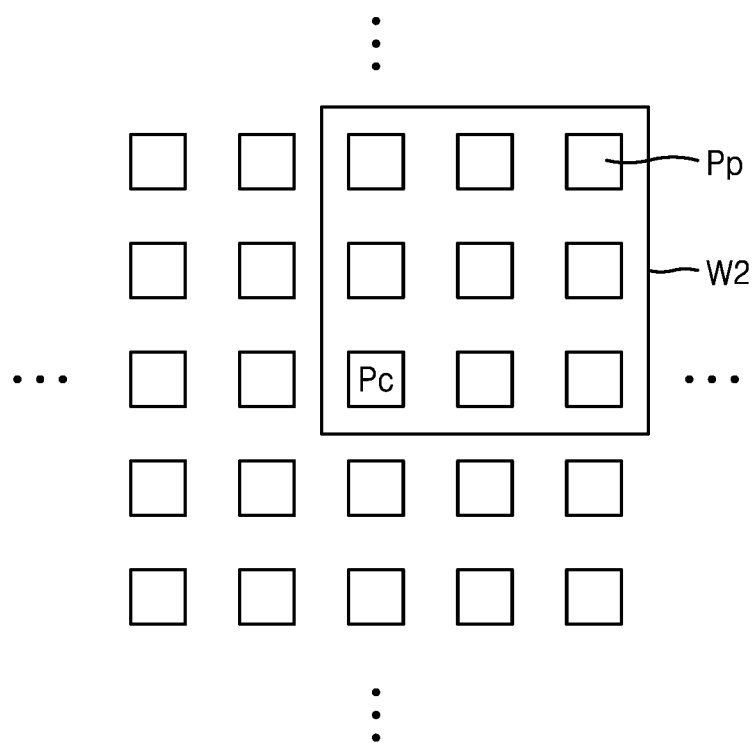

As illustrated in FIG. 5A, Equation (2) represents calculation of an absolute value $D_{00}(x, y)$ of a difference between a pixel value $I(x, y)$ of the current pixel Pc and an average value $R_{00}(x, y)$ calculated in a first direction in which the current pixel Pc is located in an upper right portion of the second window W2. As illustrated in FIG. 5B, Equation (3) represents calculation of an absolute value $D_{01}(x, y)$ of a difference between a pixel value $I(x, y)$ of the current pixel Pc and an average value $R_{01}(x, y)$ calculated in a second direction in which the current pixel Pc is located in a right middle portion of the second window W2. As illustrated in FIG. 5C, Equation (4) represents calculation of an absolute value $D_{02}(x, y)$ of a difference between a pixel value $I(x, y)$ of the current pixel Pc and an average value $R_{02}(x, y)$ calculated in a third direction in which the current pixel Pc is located in a lower right portion of the second window W2. As illustrated in FIG. 5D, Equation (5) represents calculation of an absolute value $D_{10}(x, y)$ of a difference between a pixel value $I(x, y)$ of the current pixel Pc and an average value $R_{10}(x, y)$ calculated in a fourth direction in which the current pixel Pc is located in an upper middle portion of the second window W2. As illustrated in FIG. 5E, Equation (6) represents calculation of an absolute value $D_{11}(x, y)$ of a difference between a pixel value $I(x, y)$ of the current pixel Pc and an average value $R_{11}(x, y)$ calculated in a fifth direction in which the current pixel Pc is located in a middle portion of the second window W2. As illustrated in FIG. 5F, Equation (7) represents calculation of an absolute value $D_{12}(x, y)$ of a difference between a pixel value $I(x, y)$ of the current pixel Pc and an average value $R_{12}(x, y)$ calculated in a sixth direction in which the current pixel Pc is located in a lower middle portion of the second window W2. As illustrated in FIG. 5G, Equation (8) represents calculation of an absolute value $D_{20}(x, y)$ of a difference between a pixel value $I(x, y)$ of the current pixel Pc and an average value $R_{20}(x, y)$ calculated in a seventh direction in which the current pixel Pc is located in a left upper portion of the second window W2. As illustrated in FIG. 5H, Equation (9) represents calculation of an absolute value $D_{21}(x, y)$ of a difference between a pixel value $I(x, y)$ of the current pixel Pc and an average value $R_{21}(x, y)$ calculated in an eighth direction in which the current pixel Pc is located in a left middle portion of the second window W2. As illustrated in FIG. 5I, Equation (10) represents calculation of an absolute value $D_{22}(x, y)$ of a difference between a pixel value $I(x, y)$ of the current pixel Pc and an average value $R_{22}(x, y)$ calculated in a ninth direction in which the current pixel Pc is located in a lower left portion of the second window W2.

The second intensity calculator 402 may calculate, as a second representative local intensity value $R_{hc}$, an average value calculated in a direction corresponding to a minimum value from among absolute values of a difference between an average value and a pixel value of the current pixel Pc calculated in each direction. As expressed in Equations (11) through (19), the second intensity calculator 402 may detect a minimum value from among the absolute values $D_{00}$ through $D_{22}$ calculated respectively from the first through ninth directions, and may finally output an average value corresponding to the detected minimum value as the second representative local intensity value Rho.

if $(D_{00}(x,y)==\min(D_{ij}(x,y)), R_{hc}(x,y)=R_{00}(x,y)$ (11)

if $(D_{01}(x,y)==\min(D_{ij}(x,y)), R_{hc}(x,y)=R_{01}(x,y)$ (12)

if $(D_{02}(x,y)==\min(D_{ij}(x,y)), R_{hc}(x,y)=R_{02}(x,y)$ (13)

if $(D_{10}(x,y)==\min(D_{ij}(x,y)), R_{hc}(x,y)=R_{10}(x,y)$ (14)

if $(D_{11}(x,y)==\min(D_{ij}(x,y)), R_{hc}(x,y)=R_{11}(x,y)$ (15)

if $(D_{12}(x,y)==\min(D_{ij}(x,y)), R_{hc}(x,y)=R_{12}(x,y)$ (16)

if $(D_{20}(x,y)==\min(D_{ij}(x,y)), R_{hc}(x,y)=R_{20}(x,y)$ (17)

if $(D_{21}(x,y)==\min(D_{ij}(x,y)), R_{hc}(x,y)=R_{21}(x,y)$ (18)

if $(D_{22}(x,y)==\min(D_{ij}(x,y)), R_{hc}(x,y)=R_{22}(x,y)$ (19)

Equation (11) indicates that, when the absolute value $D_{00}$ calculated in the first direction from among the absolute values $D_{00}$ through $D_{22}$ calculated in the first through ninth directions, the average value $R_{00}$ corresponding to the detected minimum value is selected as the second representative local intensity $R_{hc}$ of the current pixel Pc. Equation (12) indicates that, when the absolute value $D_{01}$ calculated in the second direction from among the absolute values $D_{00}$ through $D_{22}$ calculated in the first through ninth directions, the average value $R_{01}$ corresponding to the detected minimum value is selected as the second representative local intensity $R_{hc}$ of the current pixel Pc. Equation (13) indicates that, when the absolute value Doe calculated in the third direction from among the absolute values $D_{00}$ through $D_{22}$ calculated in the first through ninth directions, the average value $R_{02}$ corresponding to the detected minimum value is selected as the second representative local intensity $R_{hc}$ of the current pixel Pc. Equation (14) indicates that, when the absolute value $D_{10}$ calculated in the fourth direction from among the absolute values $D_{00}$ through $D_{22}$ calculated in the first through ninth directions, the average value $R_{10}$ corresponding to the detected minimum value is selected as the second representative local intensity $R_{hc}$ of the current pixel Pc. Equation (15) indicates that, when the absolute value $D_{11}$ calculated in the fifth direction from among the absolute values $D_{00}$ through $D_{22}$ calculated in the first through ninth directions, the average value Ru corresponding to the detected minimum value is selected as the second representative local intensity $R_{hc}$ of the current pixel Pc. Equation (16) indicates that, when the absolute value $D_{12}$ calculated in the sixth direction from among the absolute values $D_{00}$ through $D_{22}$ calculated in the first through ninth directions, the average value $R_{12}$ corresponding to the detected minimum value is selected as the second representative local intensity $R_{hc}$ of the current pixel Pc. Equation (17) indicates that, when the absolute value $D_{20}$ calculated in the seventh direction from among the absolute values $D_{00}$ through $D_{22}$ calculated in the first through ninth directions, the average value $R_{20}$ corresponding to the detected minimum value is selected as the second representative local intensity $R_{hc}$ of the current pixel Pc. Equation (18) indicates that, when the absolute value $D_{21}$ calculated in the eighth direction from among the absolute values $D_{00}$ through $D_{22}$ calculated in the first through ninth directions, the average value $R_{21}$ corresponding to the detected minimum value is selected as the second representative local intensity $R_{hc}$ of the current pixel Pc. Equation (19) indicates that, when the absolute value $D_{22}$ calculated in the ninth direction from among the absolute values $D_{00}$ through $D_{22}$ calculated in the first through ninth directions, the average value $R_{22}$ corresponding to the detected minimum value is selected as the second representative local intensity $R_{hc}$ of the current pixel Pc.

When there are two objects A and B in a window that significantly differ in their intensity, and a current pixel is located on object A, correcting an image by using just an average value of the current pixel and peripheral pixels without considering a complexity of a distribution of a local intensity may cause an intensity of object B to be reflected in a representative local intensity value of the current pixel, thereby distorting a representative local intensity value of the current pixel. Accordingly, halo artifacts may be generated in an image, causing a difference between a relative intensity of an area or the surroundings of an object and a relative intensity of an original image and making the image look unnatural. When an average value of the current pixel and peripheral pixels is calculated by setting a small window size to address the above problem, the side effect of amplifying noise may be generated in images having large noise.

According to an embodiment of the present disclosure, a relatively large window size may be set in a low complexity area, and a relatively small window size may be set in a high complexity area, and a representative local intensity value of a current pixel may be calculated by considering a direction in which the current pixel is included or a position of the current pixel in a window. That is, according to the embodiment of the present disclosure, by using multiple windows according to complexity of an intensity distribution, halo artifacts may be removed, and also, a representative local intensity value that is robust against noise may be generated.

The complexity calculator 403 may calculate a complexity of a local intensity distribution of the current pixel Pc based on a distribution Var of an intensity of a peripheral area of the current pixel Pc, which may be referred to as a "local intensity distribution", at operation S604. The complexity of the local intensity distribution may be dependent on the number of objects in an area of an image. For example, when there is a single object in an area of an image, the area may have a local intensity distribution of a low complexity; when there are two or more objects in an area of an image, the area may have a local intensity distribution of a high complexity.

As in Equation (20), a region for calculating the local intensity distribution Var may have an equal size to that of the first window W1 used by the first intensity calculator 401. For example, the local intensity distribution Var of the current pixel Pc may be calculated from an area having a size of $(2L+1)\times(2L+1)$ with respect to the current pixel Pc. As in Equation (21), a complexity Ca of a local intensity distribution may be a value obtained by dividing the local intensity distribution Var by the local intensity distribution Var and a constant alpha.

$$\text{Var}(x,y) = \sum_{n=-L}^{L}\sum_{m=-L}^{L}\left(\frac{I(x+n,y+m)-E(x,y)}{(2L+1)\times(2L+1)}\right)^2 \quad (20)$$

$$C_a(x,y) = \frac{\text{Var}(x,y)}{\text{Var}(x,y)+\text{alpha}} \quad (21)$$

As the local intensity distribution Var increases, a relative size of the constant alpha decreases, and thus, the complexity Ca of the local intensity distribution Var becomes close to 1, which is a maximum value. On the other hand, as the local intensity distribution Var decreases, the relative size of the constant alpha increases, and thus, the complexity Ca of the local intensity distribution Var becomes close to 0, which is a minimum value. Depending on the constant alpha, an area having a complicated intensity distribution may have a complexity Ca that is relatively low, or an area having an intensity distribution that is not complicated may have a complexity Ca that is relatively high.

When the constant alpha is a fixed value, a complexity of a local intensity distribution calculated according to Equation (21) has an absolute value that is irrespective of an image. However, according to an HVS model, human vision is sensitive to relative gaps. Thus, even within a same image, there is a need to distinguish between a relatively complex area and an area that is not relatively complex.

The complexity calculator 403 may calculate a complexity Cr of a local intensity distribution by using an intensity distribution of the entire image, which may be referred to as 'global intensity distribution', together with a local intensity distribution. That is, the complexity calculator 403 may accurately calculate the complexity Cr of the local intensity distribution by considering both the complexity Cr of the local intensity distribution and a complexity of a global intensity distribution.

The complexity calculator 403 may calculate the complexity Cr of the local intensity distribution by setting, as the constant alpha, a product of a global intensity distribution $\sigma^2$ and a weight w as shown in Equation (22). Here, $\sigma$ may be a standard deviation of a global intensity of an image, and the weight $\omega$ may be a value set by the user. In some embodiments, the weight w may be set in a range of about 0.1 to about 1.

$$C_r(x, y) = \frac{\text{Var}(x, y)}{\text{Var}(x, y) + \omega \times \sigma^2} \quad (22)$$

The third intensity calculator 404 may calculate a representative local intensity value Rr of the current pixel Pc based on the complexity Cr of the local intensity distribution of the current pixel Pc, the first representative local intensity value $R_{lc}$, and the second representative local intensity value $R_{hc}$, at operation S605. The third intensity calculator 404 may calculate, as shown in Equation (23), the representative local intensity value Rr of the current pixel Pc by using the complexity Cr of the local intensity distribution of the current pixel Pc as a weighted value and calculating a weighted sum of the first representative local intensity value $R_{lc}$ and the second representative local intensity value $R_{hc}$.

That is, when the complexity of the local intensity distribution is relatively large, the representative local intensity value Rr may be determined by increasing a weight of the second representative local intensity value $R_{hc}$, and when the complexity of the local intensity distribution is relatively small, the representative local intensity value Rr may be determined by increasing a weight of the first representative local intensity value $R_{lc}$.

$$R_r(x,y)=C_r(x,y)R_{hc}(x,y)+(1-C_r(x,y))R_{lc}(x,y) \quad (23)$$

The gamma calculator 407 may generate a local gamma value for correcting a pixel value of each pixel based on the representative local intensity value Rr, at operation S606.

When a representative local intensity value of the current pixel Pc is less than a reference value, for example when the ambient intensity is relatively low, then by using a small value as the gamma value ($\gamma$<1), local sharpness increases, and conversely, when a representative local intensity value of the current pixel Pc is greater than the reference value, for example when the ambient intensity is relatively high, then by using a large value as the gamma value ($\gamma$>1), the local sharpness increases. A first gamma value $\gamma_{high}$ for correcting a portion brighter than a reference intensity and a second gamma value $\gamma_{low}$ for correcting a portion darker than the reference intensity may be preset by the user.

The gamma calculator 407 may calculate a local gamma value ($G_r(x, y)$) of the current pixel Pc by using, as in Equation (24), the representative local intensity value Rr of the current pixel Pc as a weighted value and calculating a weighted sum of the first gamma value $\gamma_{high}$ and the second gamma value $\gamma_{low}$.

$$G_r(x,y)=R_r(x,y)\times\gamma_{high}+(1-R_r(x,y))\times\gamma_{low} \quad (24)$$

The local intensity corrector 409 may correct, as shown in Equation (25), an intensity of a pixel value I(x, y) of the current pixel Pc by applying the local gamma value $G_r(x, y)$ of the current pixel Pc generated using the gamma calculator 407, to the pixel value I(x, y) of the current pixel Pc, at operation S607. Each pixel value $LVE_r(x, y)$ of the first corrected image Ic obtained by correcting the local intensity of the input image Iin may be expressed as in Equation (25).

$$LVE_r(x,y)=I(x,y)^{G_r(x,y)} \quad (25)$$

Referring to FIG. 7, the second corrector 30B may include a histogram analyzer 503 and a global intensity corrector 505. Hereinafter, the second corrector 30B will be described with reference to FIG. 8.

The histogram analyzer 503 may generate a histogram of the input image Iin and calculate a statistical value, which is an analysis result of the histogram, at operation S801. A histogram shows a distribution of an intensity of an image, and refers to a graph obtained by setting an intensity as an x-axis and a frequency indicating how many pixels having an intensity corresponding to the intensity are in an image, as a y-axis. The histogram analyzer 503 may detect pixel values of an input image and generate a histogram by analyzing the number of pixels with respect to each intensity. The histogram analyzer 503 may calculate, as statistical values, average intensities, which are intensity averages, respectively from a plurality of cumulative probabilities preset from the histogram. For example, the statistical values may include a first average intensity value $LE_A$, which is an average intensity of a cumulative probability of the lower 1.0%, a second average intensity value $LE_B$, which is an average intensity of a cumulative probability of the lower 50%, and a third average intensity $LE_C$, which is an average intensity of the entire image, a fourth average intensity value $LE_B$, which is an average intensity of a cumulative probability of the upper 50%, and a fifth average intensity value $LE_E$, which is an average intensity of a cumulative probability of the upper 1%.

The global intensity corrector 505 may perform, in units of pixels, which may mean in each pixel, global intensity correction of correcting the pixel values $LVE_r(x, y)$ of the first corrected image Ic based on a result of comparing the statistical values of the histogram of the input image Iin and a pixel value $LVE_r(x, y)$ of the first corrected image Ic output from the first corrector 30A, at operation S803. The global intensity corrector 505 may generate a second corrected image Iout obtained by correcting the global intensity of the first corrected image Ic. Each pixel value VE(x, y) of the second corrected image Iout obtained by correcting the global intensity of the first corrected image Ic may be expressed by Equations (26) through (31).

$$\text{if } (LVE_r(x, y) < LE_A,), VE(x, y) = 0.00 \quad (26)$$

-continued else if $(LVE_r(x, y) < LE_B)$, (27)

$$VE(x, y) = 0.25 \times \frac{LVE_r(x, y) - LE_A}{LE_B - LE_A} + 0.00$$

else if $(LVE_r(x, y) < LE_C)$, (28)

$$VE(x, y) = 0.25 \times \frac{LVE_r(x, y) - LE_B}{LE_C - LE_B} + 0.25$$

else if $(LVE_r(x, y) < LE_D)$, (29)

$$VE(x, y) = 0.25 \times \frac{LVE_r(x, y) - LE_C}{LE_D - LE_C} + 0.50$$

else if $(LVE_r(x, y) < LE_E)$, (30)

$$VE(x, y) = 0.25 \times \frac{LVE_r(x, y) - LE_D}{LE_E - LE_D} + 0.75$$

else if $(LVE_r(x, y) \geq LE_E)$, $VE(x, y) = 1.00$ (31)

As shown in Equation (26), when the pixel value $LVE_r(x, y)$ of the first corrected image Ic is less than a first average intensity value $LE_A$, the global intensity corrector 505 may correct the pixel value VE(x, y) of the second corrected image Iout to 0. As shown in Equation (27), when the pixel value $LVE_r(x, y)$ of the first corrected image Ic is less than a second average intensity value $LE_B$, the global intensity corrector 505 may correct the pixel value $LVE_r(x, y)$ of the first corrected image Ic to the pixel value VE(x, y) of the second corrected image Iout by setting the second average intensity value $LE_B$ as a maximum intensity and the first average intensity value $LE_A$ as a minimum intensity. As shown in Equation (28), when the pixel value $LVE_r(x, y)$ of the first corrected image Ic is less than a third average intensity $LE_C$, the global intensity corrector 505 may correct the pixel value $LVE_r(x, y)$ of the first corrected image Ic to the pixel value VE(x, y) of the second corrected image Iout by setting the third average intensity $LE_C$ as a maximum intensity and the second average intensity $LE_B$ as a minimum intensity. As shown in Equation (29), when the pixel value $LVE_r(x, y)$ of the first corrected image Ic is less than a fourth average intensity $LE_D$, the global intensity corrector 505 may correct the pixel value $LVE_r(x, y)$ of the first corrected image Ic to the pixel value VE(x, y) of the second corrected image Iout by setting the fourth average intensity $LE_C$ as a maximum intensity the third average intensity $LE_C$ as a minimum intensity. As shown in Equation (30), when the pixel value $LVE_r(x, y)$ of the first corrected image Ic is less than a fifth average intensity $LE_E$, the global intensity corrector 505 may correct the pixel value $LVE_r(x, y)$ of the first corrected image Ic to the pixel value VE(x, y) of the second corrected image Iout by setting the fifth average intensity $LE_E$ as a maximum intensity and the fourth average intensity $LE_D$ as a minimum intensity. As shown in Equation (31), when the pixel value $LVE_r(x, y)$ of the first corrected image Ic is equal to or greater than the fifth average intensity $LE_E$, the global intensity corrector 505 may correct the pixel value VE(x, y) of the second corrected image Iout to 1.

According to the image processing device and the image enhancing method thereof according to the present disclosure, saturation and halo artifacts may be minimized by increasing local sharpness through analysis of a local intensity distribution and by using a multi-window, and image visibility may be increased by increasing global contrast.

According to an embodiment of the present disclosure, the image processor 30 may correct an image without considering the complexity of the local intensity distribution described above. The image processor 30 may correct an image of a low illuminance, such as an image with large noise or an image with a high sensor gain, without considering the complexity of the local intensity distribution. An image with a low illuminance may be determined using any method without limitation, such as by using an illuminance sensor or through image analysis, and various, methods may be used.

The image processor 30 may calculate an average value of pixel values I(x, y) of pixels in a window having a size of (2N+1)×(2N+1), as a representative local intensity value E(x, y) of the current pixel Pc, as shown in Equation (34). The image processor 30 may calculate a local gamma value G(x, y) of the current pixel Pc, as in Equation (33), by using the representative local intensity value E(x, y) of the current pixel Pc as a weighted value and calculating a weighted sum of the first gamma value $\gamma_{high}$ and the second gamma value $\gamma_{low}$. The image processor 30 may correct an intensity of the pixel value I(x, y) of the current pixel Pc by applying the local gamma value G(x, y) of the current pixel Pc to the pixel value I(x, y) of the current pixel Pc. Each pixel value LVE(x, y) of an input image obtained by correcting a local intensity thereof may be expressed as in Equation (32).

$$LVE(x, y) = I(x, y)^{G(x,y)}$$ (32)

$$G(x, y) = E(x, y) \times \gamma_{high} + (1 - E(x, y)) \times \gamma_{low}$$ (33)

$$E(x, y) = \sum_{n=-N}^{N} \sum_{m=-N}^{N} \frac{I(x+n, y+m)}{(2N+1) \times (2N+1)}$$ (34)

The image processor 30 may perform, in units of pixels, global intensity correction in which pixel values I(x, y) of an input image are corrected based on a result of comparing statistical values of a histogram of the input image and the pixel value I(x, y) of each of the pixels of the input image. Each pixel value GVE(x, y) of an image, on which global intensity correction is performed, may be expressed by Equations (35) through (40).

if $(I(x, y) < LE_A)$, $GVE(x, y) = 0.00$ (35)

else if $(I(x, y) < LE_B)$, (36)

$$GVE(x, y) = 0.25 \times \frac{I(x, y) - LE_A}{LE_B - LE_A} + 0.00$$

else if $(I(x, y) < LE_C)$, (37)

$$GVE(x, y) = 0.25 \times \frac{I(x, y) - LE_B}{LE_C - LE_B} + 0.25$$

else if $(I(x, y) < LE_D)$, (38)

$$GVE(x, y) = 0.25 \times \frac{I(x, y) - LE_C}{LE_D - LE_C} + 0.50$$

else if $(I(x, y) < LE_B)$, (39)

$$GVE(x, y) = 0.25 \times \frac{I(x, y) - LE_D}{LE_E - LE_D} + 0.75$$

else if $(I(x, y) \geq LE_E)$, $GVE(x, y) = 1.00$ (40)

The image processor 30 may perform local intensity correction on an input image according to Equation (32) and global intensity correction on the input image according to Equations (35) through (40), and an order of the local intensity correction and the global intensity may be determined arbitrarily.

That is, according to the image processing device of the embodiment of the present disclosure, different image correction methods may be selectively used according to a result of determining whether an image is a low-illuminance image. For example, when an input image is not a low-illuminance image, a first image correction method of correcting an image by using Equations (1) through (31) may be applied, and when an input image is a low-illuminance image, a second image correction method of correcting an image by using Equations (32) through (40) may be applied.

The image enhancing method performed by the image processing device according to the present disclosure can also be embodied as computer-readable code on a computer-readable recording medium. The computer-readable recording medium is any storage device that can store data which can be thereafter read by a computer system. Examples of the computer-readable recording medium include read-only memory (ROM), random-access memory (RAM), CD-ROMs, magnetic tape, floppy disks, optical data storage devices, etc. The computer-readable recording medium can also be distributed over network coupled computer systems so that the computer-readable code is stored and executed in a distributed fashion. Also, functional programs, code, and code segments for accomplishing the present disclosure can be easily construed by programmers skilled in the art to which the present disclosure pertains.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

According to the image processing device and the image enhancing method according to the embodiment of the present disclosure, visibility of an image may be increased by minimizing saturation and halo artifacts and increasing local sharpness and global contrast.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An image processing device comprising a processor configured to implement:
a first corrector configured to generate a first corrected image obtained by correcting a local intensity of an input image; and
a second corrector configured to generate a second corrected image obtained by correcting a global intensity of the first corrected image based on a histogram of the input image,
wherein the first corrector comprises:
a local intensity calculator configured to calculate a representative local intensity value of a current pixel by calculating a weighted sum of a first representative local intensity value and a second representative local intensity value with a weight value;
a gamma calculator configured to calculate a local gamma value for correcting a pixel value of the current pixel by using the representative local intensity value of the current pixel; and
a local intensity corrector configured to correct the pixel value of the current pixel by applying the local gamma value to the pixel value of the current pixel,
wherein the local intensity calculator is configured to
calculate the weight value of the current pixel based on an intensity distribution of a peripheral area of the current pixel and a global intensity distribution of the input image,
calculate the first representative local intensity value by calculating a first average value of the pixel value of the current pixel and pixel values of peripheral pixels in a first window having a first size, and
calculate the second representative local intensity value by calculating a second average value of the pixel value of the current pixel and the pixel values of peripheral pixels in a second window having a second size that is smaller than the first size.

2. The image processing device of claim 1, wherein the local intensity calculator is configured to move the second window in a plurality of directions with respect to the current pixel, and calculate the second average value of the pixel value of the current pixel and the pixel values of peripheral pixels in the second window in the plurality of directions.

3. The image processing device of claim 2, wherein the local intensity calculator is configured to calculate, as the second representative local intensity value, a minimum average value calculated in a direction corresponding to a minimum value from among a plurality of absolute values of a plurality of differences between a plurality of average values calculated in the plurality of directions and the pixel value of the current pixel.

4. The image processing device of claim 2, wherein a position of the current pixel in the second window is modified according to the plurality of directions.

5. The image processing device of claim 1, wherein the gamma calculator is configured to calculate the local gamma value by using the representative local intensity value of the current pixel as a gamma weight value and calculating a weighted sum of a first gamma value set to correct a first portion that is brighter than a reference intensity and a second gamma value set to correct a second portion that is darker than the reference intensity.

6. The image processing device of claim 1, wherein the second corrector is configured to correct the pixel value of the current pixel of the first corrected image based on a result of comparing the pixel value of the current pixel of the first corrected image with a plurality of average intensity values corresponding to a plurality of cumulative probabilities preset in the histogram.

7. An image enhancing method performed by an image processing device, the image enhancing method comprising:
calculating a weight value of a current pixel based on an intensity distribution of a peripheral area of the current pixel and a global intensity distribution of an input image;
obtaining a first representative local intensity value by calculating a first average value of a pixel value of the current pixel and pixel values of peripheral pixels in a first window having a first size;
obtaining a second representative local intensity value by calculating a second average value of the pixel value of the current pixel and the pixel values of peripheral pixels in a second window having a second size that is smaller than the first size;

calculating a representative local intensity value of the current pixel by calculating a weighted sum of the first representative local intensity value and the second representative local intensity value with the weight value;

calculating a local gamma value for correcting the pixel value of the current pixel by using the representative local intensity value of the current pixel;

generating a first corrected image by correcting the pixel value of the current pixel by applying the local gamma value to the pixel value of the current pixel; and generating a second corrected image obtained by correcting a global intensity of the first corrected image based on a histogram of the input image.

8. The image enhancing method of claim 7, wherein the calculating the second average value comprising moving the second window in a plurality of directions with respect to the current pixel, and calculating the second average value of the pixel value of the current pixel and the pixel values of peripheral pixels in the second window in the plurality of directions.

9. The image enhancing method of claim 8, wherein the calculating the second average value comprising calculating a minimum average value calculated in a direction corresponding to a minimum value from among a plurality of absolute values of a plurality of differences between a plurality of average values calculated in the plurality of directions and the pixel value of the current pixel.

10. The image enhancing method of claim 8, wherein a position of the current pixel in the second window is modified according to the plurality of directions.

11. The image enhancing method of claim 7, wherein the calculating the local gamma value comprising calculating the local gamma value by using the representative local intensity value of the current pixel as a gamma weight value and calculating a weighted sum of a first gamma value set to correct a first portion that is brighter than a reference intensity and a second gamma value set to correct a second portion that is darker than the reference intensity.

12. The image enhancing method of claim 7, wherein the generating the second corrected image comprising correcting the pixel value of the current pixel of the first corrected image based on a result of comparing the pixel value of the current pixel of the first corrected image with a plurality of average intensity values corresponding to a plurality of cumulative probabilities preset in the histogram, with the pixel value of the current pixel of the first corrected image.

* * * * *